(12) United States Patent
Ultsch et al.

(10) Patent No.: US 11,760,057 B2
(45) Date of Patent: Sep. 19, 2023

(54) POLYPROPYLENE LAMINATE SHEET

(71) Applicant: Dow Global Technologies LLC, Midland, MI (US)

(72) Inventors: Stefan Ultsch, Horgen (CH); Yushan Hu, Lake Jackson, TX (US); Jozef J.I. Van Dun, Horgen (CH); Ming Ming, Shanghai (CH)

(73) Assignee: Dow Global Technologies LLC, Midland, MI (US)

( * ) Notice: Subject to any disclaimer, the term of this patent is extended or adjusted under 35 U.S.C. 154(b) by 386 days.

(21) Appl. No.: 17/271,316

(22) PCT Filed: Aug. 31, 2018

(86) PCT No.: PCT/CN2018/103479
§ 371 (c)(1),
(2) Date: Feb. 25, 2021

(87) PCT Pub. No.: WO2020/042139
PCT Pub. Date: Mar. 5, 2020

(65) Prior Publication Data
US 2021/0252826 A1    Aug. 19, 2021

(51) Int. Cl.
| | |
|---|---|
| *B32B 5/24* | (2006.01) |
| *C09J 7/30* | (2018.01) |
| *B32B 5/02* | (2006.01) |
| *B32B 27/06* | (2006.01) |
| *B32B 27/32* | (2006.01) |

(52) U.S. Cl.
CPC ............... *B32B 5/24* (2013.01); *B32B 5/022* (2013.01); *B32B 5/024* (2013.01); *B32B 27/06* (2013.01); *B32B 27/32* (2013.01); *C09J 7/30* (2018.01); *B32B 2250/02* (2013.01); *B32B 2255/26* (2013.01); *B32B 2262/0253* (2013.01); *B32B 2307/50* (2013.01); *C09J 2423/04* (2013.01);
(Continued)

(58) Field of Classification Search
CPC ........................................................ B32B 5/24
See application file for complete search history.

(56) References Cited

U.S. PATENT DOCUMENTS

| | | |
|---|---|---|
| 5,677,383 A | 10/1997 | Chum et al. |
| 5,919,983 A | 7/1999 | Rosen et al. |

(Continued)

FOREIGN PATENT DOCUMENTS

| | | |
|---|---|---|
| JP | 2002-105259 A | 4/2002 |
| JP | 2002105833 A | 4/2002 |

*Primary Examiner* — Andrew T Piziali
(74) *Attorney, Agent, or Firm* — Boyle Fredrickson, S.C.

(57) ABSTRACT

The present disclosure provides a fabric laminate. In an embodiment, the fabric laminate includes a fabric sheet, a coating layer, and a tie layer. The fabric sheet is composed of propylene-based polymer fibers. The coating layer is composed of one or more ethylene-based polymers. The tie layer is located between the fabric sheet and the coating layer. The tie layer is composed of at least 50 wt % of a crystalline block composite (CBC) and an optional blend component. The CBC includes (i) an isotactic crystalline propylene homopolymer (iPP); (ii) an ethylene/propylene copolymer; and (iii) a diblock with the formula (EP)-(iPP). The CBC has a block composite index (CBCI) from 0.1 to 1.0. The fabric laminate has a peel force from 20 N/15 mm to 40 N/15 mm.

6 Claims, 1 Drawing Sheet

(52) U.S. Cl.
CPC ........ *C09J 2423/10* (2013.01); *C09J 2453/00* (2013.01)

(56) References Cited

U.S. PATENT DOCUMENTS

| | | |
|---|---|---|
| 6,111,023 A | 8/2000 | Chum et al. |
| 6,984,695 B2 | 1/2006 | Brown et al. |
| 7,608,668 B2 | 10/2009 | LiPiShan et al. |
| 8,168,853 B2 | 5/2012 | Autran et al. |
| 9,511,567 B2 | 12/2016 | Hu et al. |
| 9,688,795 B2 | 6/2017 | Cerk et al. |
| 2007/0275219 A1 | 11/2007 | Patel et al. |
| 2009/0233025 A1 | 9/2009 | Cvancara et al. |
| 2011/0083796 A1 | 4/2011 | Sheppard et al. |
| 2011/0135916 A1 | 6/2011 | Lu |
| 2011/0313106 A1 | 12/2011 | Shan et al. |
| 2011/0313108 A1 | 12/2011 | Shan et al. |
| 2013/0177720 A1* | 7/2013 | Liang ............... B32B 27/32 525/88 |
| 2013/0183465 A1* | 7/2013 | Liang ............... C08L 23/14 428/35.2 |
| 2014/0096825 A1 | 4/2014 | Bonekamp et al. |
| 2014/0174509 A1 | 6/2014 | Bonekamp et al. |
| 2015/0231861 A1 | 8/2015 | Hu et al. |
| 2017/0008253 A1 | 1/2017 | Su et al. |
| 2017/0008263 A1 | 1/2017 | Hu et al. |
| 2017/0330857 A1 | 11/2017 | Zou et al. |
| 2018/0355516 A1 | 12/2018 | Stoiljkovic |
| 2019/0118517 A1 | 4/2019 | Bonekamp et al. |
| 2019/0123226 A1 | 4/2019 | Bonekamp et al. |
| 2019/0300631 A1 | 10/2019 | Coates et al. |

\* cited by examiner

POLYPROPYLENE LAMINATE SHEET

BACKGROUND

Known are fabric sheets, such as scrims and tarpaulins for example, for use in myriad commercial and industrial applications. Fabric sheets made from polyolefin—and in particular, fabric sheets made of polypropylene—find widespread use in outdoor industrial environments because of polypropylene's high modulus, high mechanical strength, and resilience when exposed to harsh weather conditions.

Further known is the lamination of a layer of polyethylene onto polypropylene fabric sheet. Polypropylene and polyethylene, however, are not compatible with each other. Over time, the polyethylene layer peels away from the polypropylene fabric, leaving a degraded and ineffective fabric sheet.

Consequently, the art recognizes the need for structures and compositions that can impart greater adhesion between the polypropylene layer and the polyethylene layer in multilayer fabric sheets. A need exists for a fabric sheet with improved adhesion between the polypropylene fabric sheet and the polyethylene layer.

SUMMARY

The present disclosure provides an article. The article is a fabric laminate. In an embodiment, the fabric laminate includes a fabric sheet, a coating layer, and a tie layer. The fabric sheet is composed of propylene-based polymer fibers. The coating layer is composed of one or more ethylene-based polymers. The tie layer is located between the fabric sheet and the coating layer. The tie layer is composed of at least 50 wt % of a crystalline block composite (CBC) and an optional blend component. The CBC includes (i) an isotactic crystalline propylene homopolymer (iPP); (ii) an ethylene/propylene copolymer; and (iii) a diblock with the formula (EP)-(iPP). The CBC has a block composite index(CBCI) from 0.1 to 1.0. The fabric laminate has a peel force from 20 N/15 mm to 40 N/15 mm (Peak Load).

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both polymer polydispersity (PDI or Mw/Mn) and block length distribution, due to the effect of shuttling agent(s) in combination with the catalyst(s) employed in their preparation.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers™ (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

"Fabric" is a woven structure or a non-woven structure formed from individual fibers or yarn.

"Fiber" and like terms refer to a single, continuous strand of elongated material having generally round cross-section and a length to diameter ratio of greater than 10.

An "interpolymer" is a polymer prepared by the polymerization of at least two different types of monomers. The generic term interpolymer thus includes copolymers (employed to refer to polymers prepared from only two different types of monomers), terpolymers (employed to refer to polymers prepared from three different types of monomers), and polymers prepared from more than three different types of monomers.

An "olefin-based polymer" or "polyolefin" is a polymer that contains a majority amount, or greater than 50 wt %, of polymerized olefin monomer, for example, ethylene or propylene, (based on the weight of the polymer), and optionally, may contain at least one comonomer. A nonlimiting example of an olefin-based polymer is an ethylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer." Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. The terms "propylene-based polymer" and "polypropylene" may be used interchangeably.

"Sheet" unless expressly having the thickness specified, includes any thin, flat thermoplastic structure having a generally consistent and uniform thickness greater than "a film," and greater than 0.254 millimeters thick and up to about 7.5 mm (295 mils) thick. A sheet, as used herein, is distinct from, and excludes of a film. A "film," including when referring to a "film layer" in a thicker article, unless expressly having the thickness specified, includes any thin, flat extruded or cast thermoplastic article having a generally consistent and uniform thickness up to about 0.254 millimeters (10 mils).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

"Yarn" is a continuous length of twisted or otherwise entangled fibers or filaments that can be used in the manufacture of woven fabrics.

Test Methods

The term "denier" is the linear mass density of a fiber. Denier is defined as the grams of the fiber per 9000 meters of the fiber length.

Density is measured in accordance with ASTM D792, Method B. The result is recorded in grams (g) per cubic centimeter (g/cc or g/cm³).

Melt flow rate (MFR) is measured in accordance with ASTM D-1238 (230° C.; 2.16 kg). The result is reported in grams/10 minutes. Melt index (MI) is measured in accordance with ASTM D-1238 (190° C.; 2.16 kg). The result is reported in grams/10 minutes.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature were reported from the second heat curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997). The melting point is the peak temperature.

Glass transition temperature, $T_g$, was determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the $T_g$ region. The temperature at which the sample heat capacity was half-way between these baselines is the $T_g$.

Fabric weight is the mass per unit area of the fabric and is measured in accordance with ASTM D3776, with results reported in grams per square meter, gsm.

Gel Permeation Chromatography (GPC) for Molecular Weight

A high temperature gel permeation chromatography (GPC) system such as unit from Agilent Technology, and PolymerChar (Valencia, Spain) were used. The concentration detector was an Infra-red detector (IR-5) from Polymer Char Inc. Data collection was performed using GPCOne (PolymerChar) The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen-purged TCB containing approximately 200 ppm 2,6-di-t-butyl-4-methylphenol (BHT). The flow rate was 1.0 mL/min, and the injection volume was 200 μl. A "2 mg/mL" sample concentration was prepared by dissolving the sample in N2 purged and preheated TCB (containing 200 ppm BHT), for 2.5 hours at 160° C., with gentle agitation.

The GPC column set was calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)).

Heat Seal Strength

Heat seal measurements on the laminated sheet are performed on a commercial tensile testing machine according to ASTM F-88 (Technique A). Prior to cutting, the sheets are conditioned for a minimum of 40 hrs at 23° C. (±2° C.) and 50% (±5%) R.H. per ASTM D-618 (Procedure A). Sheets are then cut in the machine direction to a length of approximately 11 inches and a width of approximately 8.5 inches.

The sheets are heat sealed (film side sealed to film side) across the machine direction on a Kopp Heat Sealer at 150° C. under the following conditions:
  Sealing Pressure: 0.275 N/mm$^2$
  Sealing Dwell Time: 4 seconds The sealed sheets are conditioned for a minimum of 3 hours at 23° (±2° C.) and 50% R.H (±5%) prior to cutting into one inch wide strips. These strips are then further conditioned for a minimum of 24 hours at 23° (±2° C.) and 50% R.H (±5%) prior to testing. For testing, the strips are loaded into the grips of a tensile testing machine at an initial separation of 2 inches and pulled at a grip separation rate of 10 inches/min at 23° (±2° C.) and 50% R.H (±5%). The strips are tested unsupported. Six replicate tests are performed, and average of the Peak Load is reported in Newtons per 15 millimeters (N/15 mm).

High Temperature Liquid Chromatography (HTLC)

High Temperature Liquid Chromatography (HTLC) Experimental Method Instrumentation was performed according to the published method of D. Lee et al., J. Chromatogr. A 2011, 1218, 7173, with minor modifications. Two Shimadzu (Columbia, Md., USA) LC-20AD pumps were used to deliver decane and trichlorobenzene (TCB), respectively. Each pump was connected to a 10:1 fixed flow splitter (Part #: 620-P020-HS, Analytical Scientific Instruments Inc., CA, USA). The splitter had a pressure drop of 1500 psi (10.34 MPa) at 0.1 mL/min in H$_2$O according to the manufacturer. The flow rate of both pumps was set at 0.115 mL/min. After the splitting, the minor flow was 0.01 mL/min for both decane and TCB, determined by weighing the collected solvents for more than 30 min. The volume of the collected eluent was determined by the mass and the densities of the solvents at room temperature. The minor flow was delivered to the HTLC column for separation. The main flow was sent back to the solvent reservoir. A 50-µL mixer (Shimadzu) was connected after the splitters to mix the solvents from the Shimadzu pumps. The mixed solvents were then delivered to the injector in the oven of Waters (Milford, Mass., USA) GPCV2000. A Hypercarb™ column (2.1×100 mm, 5 µm particle size) was connected between the injector and a 10-port VICI valve (Houston, Tex., USA). The valve was equipped with two 60-µL sample loops. The valve was used to continuously sample eluent from the first dimension (D1) HTLC column to the second dimension (D2) SEC column. The pump of Waters GPCV2000 and a PLgel Rapid™-M column (10×100 mm, 5 µm particle size) were connected to the VICI valve for D2 size exclusion chromatography (SEC). The symmetric configuration was used for the connections as described in the literature (Y. Brun & P. Foster, J. September Sci. 2010, 33, 3501). A dual-angle light scattering detector (PD2040, Agilent, Santa Clara, Calif., USA) and an IR5 inferred absorbance detector were connected after the SEC column for measurement of concentration, composition, and molecular weight.

Separation for HTLC: Approximately 30 mg were dissolved in 8-mL decane by gently shaking the vial at 160° C. for 2 hours. The decane contained 400 ppm BHT(2,6-Di-tert-butyl-4-methylphenol) as the radical scavenger. The sample vial was then transferred to the autosampler of GPCV2000 for injection. The temperatures of the autosampler, the injector, both the Hypercarb and the PLgel columns, the 10-port VICI valve, and both the LS and IR5 detectors were maintained at 140° C. throughout the separation.

The initial conditions before injection were as follows: flow rate for the HTLC column was 0.01 mL/min; solvent composition in the D1 Hypercarb column was 100% decane; flow rate for the SEC column was 2.51 mL/min at room temperature; solvent composition in the D2 PLgel column was 100% TCB; solvent composition in the D2 SEC column did not change throughout the separation.

A 311-µL aliquot of sample solution was injected into the HTLC column. The injection triggered the gradient described below:
  from 0-10 min, 100% decane/0% TCB;
  from 10-651 min, TCB was increased linearly from 0% TCB to 80% TCB.

The injection also triggered the collection of the light scattering signal at 15° angle (LS15) and the "measure" and "methyl" signals from IR5 detector (IRmeasure and IRmethyl) using EZChrom™ chromatography data system (Agilent). The analog signals from detectors were converted to digital signals through a SS420X analog-to-digital converter. The collection frequency was 10 Hz. The injection also triggered the switch of the 10-port VICI valve. The switch of the valve was controlled by the relay signals from the SS420X converter. The valve was switched every 3 min. The chromatograms were collected from 0 to 651 min. Each chromatogram consisted of 651/3=217 SEC chromatograms.

After the gradient separation, 0.2 mL of TCB and 0.3 mL of decane were used to clean and re-equilibrate the HTLC column for next separation. The flow rate of this step was 0.2 mL/min, delivered by a Shimadzu LC-20 AB pump connected to the mixer.

$^{13}$C Nuclear Magnetic Resonance (NMR)

Sample Preparation: samples were prepared by adding approximately 2.6 g of a 50/50 mixture of tetrachloroethane-d2/orthodichlorobenzene that was 0.025M in chromium acetylacetonate (relaxation agent) to 0.21 g sample in a 10 mm NMR tube. The samples were dissolved and homogenized by heating the tube and its contents to 135-140° C.

Data Acquisition Parameters: data was collected using a Bruker 400 MHz spectrometer equipped with a Bruker Dual DUL high-temperature CryoProbe. The data was acquired using 320 transients per data file, a 7.3 sec pulse repetition delay (6 sec delay+1.3 sec acq. time), 90 degree flip angles, and inverse gated decoupling with a sample temperature of 120° C. All measurements were made on non-spinning samples in locked mode. Samples were homogenized immediately prior to insertion into the heated (125° C.) NMR Sample changer, and were allowed to thermally equilibrate in the probe for 7 minutes prior to data acquisition. The acquisitions were carried out using spectral width of 25,000 Hz and a file size of 65K data points. The NMR is used to determine total weight percent of ethylene of whole polymer, the weight percent of ethylene in xylene soluble fraction, e.g., with respect to the crystalline block composite index or block composite index discussed below. Melt index (MI) (I2) is measured according to ASTM D1238, Condition 190° C./2.16 kilogram (kg) weight, and is reported in grams eluted per 10 minutes (g/10 min).

Peel Force

Peel force (adhesion measurement) between film and fabric are made following ASTM F904. Prior to testing, the films are conditioned for a minimum of 40 hrs at 23° C. (±2° C.) and 50% (±10%) R.H. The laminated sheets are then cut into 1 inch wide strips along the machine direction. The layers are manually separated to give 'ears' of approximately 1 inch long that can be gripped in a tensile tester. For strongly adhered samples where the 1 inch ears are difficult to form, a small 'ears' can be taped with masking tape and each ear gripped in the jaws of a tensile testing machine and then slowly pulled at 1 in/min until sufficient material has been delaminated to re-clamp. The newly reattached sample is then tested at 10 in/min. Five specimens are tested and average of the Peak Load is reported.

Some adhesion measurements between film and fabric are made according to ISO 11339 using 15 mm width strip. Strips of 15 mm wide by 100 mm long are cut from the sealed area. Adhesion is measured along the machine direction. Delamination is initiated by carefully opening the seal. The specimens are peeled at 100 mm min-1. Five specimens are tested and average of the Peak Load is reported in Newtons per 15 millimeters (N/15 mm).

Thermal Gradient Interaction Chromatography (TGIC)

A commercial Crystallization Elution Fractionation instrument (CEF) (Polymer Char, Spain) was used to perform the thermal gradient interaction chromatography (TGIC) measurement (Cong, et al., Macromolecules, 2011, 44 (8), 3062-3072). A single Hypercarb column (100×4.6 mm, 5 micron particles, Thermo Scientific) was used for separation. The experimental parameters were: top oven/transfer line/needle temperature at 160° C., dissolution temperature at 160° C., dissolution stirring setting of 2, pump stabilization time of 15 seconds, a pump flow rate of cleaning column at 0.500 mL/m, pump flow rate of column loading at 0.300 ml/min, stabilization temperature at 160° C., stabilization time (pre, prior to load to column) at 1.0 min, stabilization time (post, after loaded to column) at 1.0 min, SF(Soluble Fraction) time at 8.0 min, cooling rate of 5.0° C./min from 160° C. to 90° C., flow rate during cooling process of 0.01 ml/min, isothermally held at 90° C. for 10 minutes, heating rate of 5.0° C./min during elution from 90° C. to 160° C., isothermal time at 150° C. for 10 min, elution flow rate of 0.500 mL/min, and an injection loop size of 140 microliters. Samples were prepared by the PolymerChar autosampler at 160° C., for 120 minutes, at a concentration of 4.0 mg/ml in ODCB (1,2-Dichlorobenzene, anhydrous grade or HPLC grade). TGIC column temperature calibration is done according to the reference (Cerk and Cong, U.S. Pat. No. 9,688,795).

The chromatogram consists of two peaks. The first peak is defined as free iPP peak, which is defined as the material remaining in ODCB at 90° C., the percentage of free iPP peak is calculated by the area of the first peak/total area of the chromatogram multiplying by 100%. The chromatogram is integrated with "GPCOne" software (PolymerChar, Spain). A straight baseline is drawn from the visible difference, when the $2^{nd}$ peak falls to a flat baseline at high elution temperature, and the minimum or flat region of detector signal on the low temperature side of the first peak. The upper temperature integration limit is established, based on the visible difference, when the 2nd peak falls to the flat baseline region (roughly around 170° C.). The upper temperature integration limit for the first peak is established, based on the intersection point of baseline with the chromatogram including the first peak. The lower temperature integration limit of the first peak is based on the intersection point of baseline with the chromatogram before the first peak.

Xylene Soluble (XS) Fractionation Analysis (ASTM D5492-17)

A weighed amount of resin (2.0000±0.1000, g) was dissolved in 200 ml o-xylene under reflux conditions. The solution was then cooled in a temperature controlled water bath to 25° C. for 60 minutes to allow the crystallization of the xylene insoluble (XI) fraction. Once the solution was cooled and the insoluble fraction precipitates from the solution, the separation of the xylene soluble (XS) fraction from the xylene insoluble fraction (XI) was done by filtration through a filter paper. The remaining o-xylene in xylene solution was evaporated from the filtrate, dried according ASTM D5492-17. The ethylene content in the dried xylene soluble fraction (wt % C2 in xylene soluble) was measured by using $^{13}C$ NMR method specified herein.

DETAILED DESCRIPTION

The present disclosure provides a fabric laminate. The fabric laminate includes a fabric sheet, a coating layer, and a tie layer located between the fabric sheet and the coating layer. The fabric sheet is composed of propylene-based polymer fibers. The coating layer is composed of one or more ethylene-based polymers. The tie layer is composed of at least 50 wt % of a crystalline block composite (CBC) and an optional blend component. The CBC has a crystalline block composite index (CBCI) from 0.1 to 1.0. The fabric laminate has a peel force from 20 N/15 mm to 40 N/15 mm (Peak Load).

The present disclosure is directed to a fabric laminate. A "fabric laminate," as used herein, is a multicomponent structure whereby one or more layers are in contact with a fabric structure.

A. Fabric Sheet

The present fabric laminate includes a fabric structure, such as a fabric sheet. A "fabric sheet," as used herein, is a woven fabric structure or a non-woven fabric structure formed from individual fibers (or yarns) composed of an olefin-based polymer, the fibers having a density from 500 denier to 1600 denier, the fabric sheet having a thickness from 0.5 mm to 2.0 mm.

The fabric sheet can be a woven fabric or a non-woven fabric. A "woven fabric" is an assembly of interlaced fibers (or yarns). The woven fabric is fabricated by weaving two distinct sets of fibers—the warp fibers (or "warp") and the weft fibers (or "weft"). The warp is the set of fibers in place in a loom before the weft is introduced. The weft is the set of fibers introduced during the weaving process. The lengthwise or longitudinal warp fibers are held stationary in tension on a frame or a loom while the transverse weft fibers are drawn through and inserted over-and-under the warp. The warp and the weft are interlaced at right angles to form the fabric. Nonlimiting examples of interlaced woven fabric structures include lock-stitch knitted fabric, A "non-woven fabric" is an assembly of fibers (or yarns) held together in a random web such as by mechanical interlocking, heat, chemicals, pressure or by fusing at least a portion of the fibers to form a cohesive fabric-like material. Nonlimiting techniques to fabricate non-woven fabric include spunbond process, carded web process, air laid process, thermo-calendaring process, adhesive bonding process, hot air bonding process, needle punch process, hydroentangling process, electrospinning process, and combinations thereof.

In an embodiment the fabric sheet is a woven fabric with fibers composed of a propylene-based polymer. The propylene-based polymer may be propylene homopolymer, a propylene/α-olefin copolymer, and combinations thereof. Nonlimiting examples of propylene/α-olefin copolymer include copolymer with propylene and with a $C_2$ α-olefin comonomer (i.e., propylene/ethylene copolymer) or propylene with at least one $C_4$-$C_{10}$ α-olefin comonomer.

In an embodiment, the fabric sheet is a woven fabric with fibers composed of propylene homopolymer. The fabric sheet has one, some, or all of the following properties:

(i) a fiber density from 500 denier, or 750 denier to 1000 denier, or 1200 denier; and/or (ii) a fabric weight from 250 gsm, or 300 gsm, or 320 gsm, or 340 gsm, or 350 gsm to 360 gsm, or 380 gsm, or 400 gsm, or 420 gsm; and/or (iii) a sheet thickness from 0.3 mm, or 0.5 mm, or 1.0 mm, or 1.25 mm to 1.5 mm, or 1.75 mm, or 2.0 mm.

B. Coating Layer

The present fabric laminate includes a coating layer. The coating layer is composed of one or more ethylene-based polymers. The ethylene-based polymer can be an ethylene homopolymer or an ethylene/α-olefin copolymer. Nonlimiting examples of suitable ethylene/α-olefin copolymer include ethylene/$C_3$-$C_{12}$ α-olefin copolymers. Nonlimiting examples of suitable ethylene-based polymer include LDPE, LLDPE, ULDPE, VLDPE, EPE, ethylene/α-olefin multi-block copolymers, substantially linear, or linear, plastomers/elastomers, HDPE, and combinations thereof.

In an embodiment, the ethylene-based polymer is an ethylene/$C_3$-$C_{12}$ α-olefin copolymer. The ethylene/$C_3$-$C_{12}$ α-olefin copolymer can be an HDPE, an LLDPE, an LDPE, a ULDPE, a VLDPE, an ethylene/α-olefin block copolymer, and any combination thereof.

In an embodiment, the ethylene-based polymers is an ethylene/$C_3$-$C_8$ α-olefin copolymer that is a is a homogeneously branched ethylene/$C_3$-$C_8$ α-olefin copolymer. Homogeneously branched ethylene/$C_3$-$C_8$ α-olefin copolymer can be made with a single-site catalyst such as a metallocene catalyst or constrained geometry catalyst, and typically has a melting point from 75° C., or 80° C., or 85° C. to 90° C., or 100° C., or 105° C.

Illustrative homogeneously branched ethylene/$C_3$-$C_8$ α-olefin copolymers include ethylene/propylene, ethylene/butene, ethylene/1-hexene, and ethylene/1-octene.

Nonlimiting examples of commercially available homogeneously branched ethylene/$C_3$-$C_8$ α-olefin copolymers include homogeneously branched, linear ethylene-α-olefin copolymers (e.g. TAFMER® by Mitsui Petrochemicals Company Limited and EXACT® by Exxon Chemical Company), and the homogeneously branched, substantially linear ethylene-α-olefin polymers (e.g., AFFINITY and ENGAGE polyethylene available from the Dow Chemical Company). An exemplary interpolymer is ENAGE 8480 commercially available from The Dow Chemical Company.

In an embodiment, the coating layer includes an ethylene/α-olefin multi-block copolymer the term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority weight fraction of the whole ethylene/α-olefin multi-block copolymer, i.e., ethylene comprises at least 50 wt % of the whole ethylene/α-olefin multi-block copolymer. More preferably, ethylene comprises at least 60 wt %, or at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties:

(i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C. to 120° C., or 122° C., or 125° C.; and/or (iv) a melt index (MI) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5.0 mol %, or 6.0 mol %, or 7.0 mol %, or 9.0 mol % octene in the hard segment; and/or (viii) an elastic recovery (Re) from 50%, or 60% to 70%, or 80%, or 90%, at 300% min deformation rate at 21° C. as measured in accordance with ASTM D1708; and/or (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

C. Tie Layer

The present fabric laminate includes a tie layer. The tie layer is disposed between, or is otherwise located between, the fabric sheet and the coating layer. In other words, the fabric sheet is disposed on a first surface of the tie layer and the coating layer is disposed on an opposing second surface of the tie layer.

The tie layer contains at least 50 wt % of the CBC and an optional blend component. The term "crystalline block composite" ("CBC") refers to polymers containing three components:

(i) a crystalline ethylene based polymer (CEP) (also referred to herein as a soft polymer);

(ii) a crystalline alpha-olefin based polymer (CAOP) (also referred to herein as a hard polymer); and (iii) a block copolymer comprising a crystalline ethylene block (CEB) and a crystalline alpha-olefin block (CAOB);

wherein the CEB of the block copolymer is the same composition as the CEP of component (i) of the block composite and the CAOB of the block copolymer is the same composition as the CAOP of component (ii) of the block composite. Additionally, the compositional split between the amount of CEP and CAOP will be essentially the same as that between the corresponding blocks in the block copolymer. When produced in a continuous process, the CBC has a polydispersity index (PDI) from 1.7, or 1.8 to 3.5, or 5, or 10, or 15. Such CBC is described in, for example, US Patent Application Publication Nos. 2011/0313106, 2011/0313108 and 2011/0313108, all published on 22 Dec. 2011, and in PCT Publication No. WO2014/043522A1, published 20 Mar. 2014, each of which are incorporated herein by reference with respect to descriptions of CBC, processes to make CBC, and methods of analyzing CBC.

The crystalline ethylene based polymer (CEP) contains least 90 mol % polymerized ethylene units in which any comonomer content is 10 mol % or less, or from 0 mol % to 5 mol %, or 7 mol %, or 10 mol %. The crystalline ethylene based polymer has corresponding melting points that are 75° C. and above, or 90° C. and above, or 100° C. and above.

The crystalline alpha-olefin based polymer (CAOP) is a highly crystalline polymer containing polymerized α-olefin units in which the monomer (e.g., propylene) is present in an amount greater than 90 mol %, or greater than 93 mol %, or greater than 95 mol %, or greater than 98 mol %, based on the total weight of the crystalline α-olefin based polymer (propylene). In an embodiment, the polymerized α-olefin unit is polypropylene. The comonomer (e.g., ethylene) content in the CAOP is less than 10 mol %, or less than 7 mol %, or less than 5 mol %, or less than 2 mol %. CAOPs with propylene crystallinity have corresponding melting points that are 80° C. and above, or 100° C. and above, or 115° C. and above, or 120° C. and above. In an embodiment, the CAOP comprises all, or substantially all, propylene units.

Nonlimiting examples of other suitable α-olefin units (in addition to propylene) that may be used in the CAOP are those that contain 4 to 10 carbon atoms, such as 1-butene, 1-hexene, 4-methyl-1-pentene and 1-octene. Nonlimiting examples of suitable diolefins include isoprene, butadiene, 1,4-pentadiene, 1,4-hexadiene, 1,5-hexadiene, 1,7-octadiene, 1, 9-decadiene, dicyclopentadiene, methylene-norbornene, 5-ethylidene-2-norbornene, or the like, and combinations containing at least one of the foregoing α-olefin units.

The block copolymer of the CBC contains an ethylene block (e.g., a crystalline ethylene block (CEB)) and a crystalline alpha olefin block (CAOB). In the crystalline ethylene block (CEB), ethylene monomer is present in an amount greater than 90 mol %, or greater than 93 mol %, or greater than 95 mol %, or greater than 90 mol %, based on the total number of moles of the CEB. In an embodiment, the crystalline ethylene block (CEB) polymer is polyethylene. The polyethylene is present in an amount greater than 90 mol %, or greater than 93 mol %, or greater than 95 mol %, based on the total number of moles of the CEB. If any comonomer is present in the CEB, it is present in an amount of less than 10 mol %, or less than 5 mol %, based on the total number of moles of the CEB.

The CAOB includes a polypropylene block that is copolymerized with other α-olefin units that contain 4 to 10 carbon atoms. Nonlimiting examples of suitable α-olefins are provided above. The polypropylene is present in the CAOB in an amount of greater than or equal to 90 mol %, or greater than 93 mol %, or greater than 95 mol %, based on the total number of moles of the CAOB. The comonomer content in the CAOB is less than 10 mol %, or less than 7 mol %, or less than 5 mol percent, based on the total number of moles in the CAOB. A CAOB with propylene crystallinity has a corresponding melting point that is 80° C. and above, or 100° C. and above, or 115° C. and above, or 120° C. and above. In an embodiment, the CAOB comprises all, or substantially all, propylene units.

In an embodiment, the CBC contains propylene, 1-butene or 4-methyl-1-pentene and one or more comonomers. In a further embodiment, the CBC contains, in polymerized form, propylene and ethylene and/or one or more $C_{4-20}$ α-olefin comonomers, and/or one or more additional copolymerizable comonomers, or the CBC contains 4-methyl-1-pentene and ethylene and/or one or more $C_{4-20}$ α-olefin comonomers, or the CBC contains 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. In an embodiment, the monomer is propylene and the comonomer is ethylene.

Comonomer content in the CBC may be measured using any suitable technique, such as techniques based on nuclear magnetic resonance (NMR) spectroscopy.

In an embodiment, the CBC has a melting point Tm greater than 100° C., or greater than 120° C., or greater than 125° C. In an embodiment, the Tm is in the range of from 100° C., or 120° C., or 125° C. to 220° C., or 250° C. In an embodiment, the CBC has a melt flow rate (MFR) from 0.1 g/10 min to 30 g/10 min, or 50 g/10 min, or 1000 g/10 min.

In an embodiment, the CBC has a weight average molecular weight (Mw) from 10,000 g/mol, or 35,000 g/mol, or 50,000 g/mol to 200,000 g/mol, or 300,000 g/mol, or 1,000,000 g/mol, or 2,500,000 g/mole.

In an embodiment, the CBC has a Crystalline Block Composite Index (CBCI) from greater than zero, or 0.1, or 0.2, or 0.3 to 0.4, or 0.5, or 0.6, or 0.7, or 0.8, or 0.9, or 1.0. In another embodiment, the CBC has a CBCI from 0.4, or 0.5 to 0.6, or 0.7, or 0.8.

In an embodiment, the CBC contains (i) from 0.5 wt % to 79 wt %, or 95 wt % CEP; (ii) from 0.5 wt % to 79 wt %, or 95 wt % CAOP; and (iii) from 5 wt %, or 50 wt % to 99 wt % block copolymer, based on total weight of crystalline block composite.

The sum of the weight percents of CEP, CAOP and block copolymer equals 100%

In an embodiment, the block copolymer of the CBC contains from 5 wt %, or 10 wt %, or 25 wt %, or 30 wt % to 70 wt %, or 75 wt %, or 90 wt %, or 95 wt % crystalline ethylene blocks (CEB); and from 95 wt %, or 90 wt %, or 75 wt %, or 70 wt % to 30 wt %, or 25 wt %, or 10 wt %, or 5 wt % crystalline alpha-olefin blocks (CAOB).

In an embodiment, the CBC contains (i) a CEP that is a crystalline ethylene/propylene copolymer (CEP); (ii) a CAOP that is an isotactic crystalline propylene homopolymer (iPP); and (iii) a block copolymer containing an iPP block (CAOB) and an EP block (CEB); wherein the block copolymer includes a diblock with the Formula (2): (CEP)–(iPP) Formula (2).

In an embodiment, the CBC contains:

(i) from 0.5 wt %, or 10 wt %, or 20 wt %, or 30 wt % to 40 wt %, or 50 wt %, or 60 wt %, or 70 wt %, or or 79 wt %, or 95 wt % CEP;

(ii) from 0.5 wt %, or 10 wt %, or 20 wt %, or 30 wt % to 40 wt %, or 50 wt %, or 60 wt %, or 70 wt %, or or 79 wt %, or 95 wt % iPP; and (iii) from 5 wt %, or 10 wt %, or 25 wt %, or 30 wt %, or 50 wt % to 70 wt %, or 80 wt %, or 90 wt %, or 95 wt %, or 99 wt % block copolymer, based on total weight of the CBC; and the crystalline block composite has one, some, or all of the following properties:

(a) the CEP contains from 85 wt %, or 89 wt % to 92 wt %, or 95 wt %, or 99 wt % ethylene and a reciprocal amount of propylene, or from 1 wt %, or 5 wt %, or 8 wt % to 11 wt %, or 15 wt % propylene, based on the total weight of the CEP; and/or (b) the iPP contains from 100 wt %, or 99.5 wt %, or 99 wt % to 95 wt %, or 90 wt %, or 85 wt %, or 80 wt %, or 75 wt %, or 70 wt %, or 65 wt %, or 60 wt %, or 55 wt % propylene and a reciprocal amount of ethylene, or from 0 wt %, or 0.5 wt % to 1 wt %, or 5 wt %, or 10 wt %, or 15 wt %, or 20 wt %, or 25 wt %, or 30 wt %, or 35 wt %, or 40 wt %, or 45 wt % ethylene, based on the total weight of the iPP; and/or (c) the block copolymer contains from 5 wt %, or 10 wt %, or 25 wt %, or 30 wt % to 50 wt %, or 70 wt %, or 75 wt %, or 90 wt %, or 95 wt % EB and a reciprocal amount, or from 95 wt %, or 90 wt %, or 75 wt %, or 70 wt %, or 50 wt % to 30 wt %, or 25 wt %, or 10 wt %, or 5 wt % iPP blocks, based on the total weight of the block copolymer; and/or (d) a CBCI from 0.4, or 0.5 to 0.6, or 0.7, or 0.8; and/or (e) a melt flow rate (MFR) from 0.1 g/10 min, or 5 g/10 min, or 10 g/10 min, or 15 g/10 min, or 20 g/10 min, or 23 g/10 min to 40 g/10 min, or 50 g/10 min, or 1000 g/10 min; and/or (f) a weight average molecular weight (Mw) from 50,000 g/mol, or 70,000 g/mol, or 80,000 g/mol, or 100,000 g/mol to 130,000 g/mol, or 150,000 g/mol, or 200,000 g/mol, or 300,000 g/mol, or 500,000 g/mol, or 1,000,000 g/mol; and/or (g) a Mw/Mn from 1.0, or 1.5, or 2.0, or 2.5, or 3.0, or 3.5, or 3.7, or 3.8, or 4.0 to 4.3, or 4.5, or 5.0; and/or (h) a heat of fusion (or melt enthalpy) from 20 J/g, or 25 J/g, or 30 J/g, or 35 J/g, or 50 J/g, or 60 J/g, or 70 J/g, or 75 J/g, or 80 J/g, or 85 J/g, or 90 J/g, or 92 J/g to 100 J/g, or 110 J/g, or 115 J/g, or 125 J/g; and/or (i) a crystallization temperature, Tc, from 70° C., or 75° C., or 80° C., or 85° C., or 90° C. to 95° C., or 100° C.; and/or (j) a first peak Tm from 100° C., or 110° C., or 120° C., or 130° C. to 136° C., or 140° C., or 145° C., or 150° C.; and/or (k) a second peak Tm from 90° C., or 95° C., or 100° C., or 103° C. to 105° C., or 110° C., or 115° C., or 120° C., or 125° C., or 130° C., or 140° C., or 150° C.; and/or (l) a total ethylene content from 20 wt %, or 25 wt %, or 28 wt % to 47 wt %, or 50 wt %, or 55 wt %, or 60 wt %, or 70 wt %, based on the total weight of the CBC.

It is understood that the sum of the components in each of the composite components and blends disclosed herein, including the foregoing composite components, yields 100 wt %.

It is understood that the sum of the components in each of the polymers disclosed herein, including the foregoing polymers, yields 100 mol %.

D. Optional Additive(s)

The fabric sheet and/or the coating layer and/or the tie layer may include one or more optional additives. Nonlimiting examples of suitable additives include plasticizers, oils, stabilizers, antioxidants, pigments, dyestuffs, antiblock additives, polymeric additives, defoamers, preservatives, thickeners, rheology modifiers, humectants, flame retardants, fillers, solvents, nucleating agents, surfactants, chelating agents, gelling agents, processing aids, neutralizing agents, flame retardants, fluorescing agents, compatibilizers, antimicrobial agents, water, and combinations thereof.

E. Fabric Laminate

The present fabric laminate includes the fabric sheet composed of propylene-based polymer fabric, the coating layer composed of one or more ethylene-based polymer(s), and the tie layer disposed between the fabric sheet and the coating layer. The fabric laminate has a peel force from 20N/15 mm to 40 N/15 mm (Peak Load). The fabric laminate has a total thickness from 1.25 mm, or 1.7 mm, or 1.9 mm to 2.0 mm, or 2.3 mm, or 2.5 mm.

In an embodiment, the fabric laminate includes the fabric sheet composed of propylene homopolymer fabric. The coating layer is a blend composed of (i) an ethylene/$C_4$-$C_8$ α-olefin multi-block copolymer and an ethylene/$C_4$-$C_8$ α-olefin copolymer (that is not a block copolymer). The tie layer is a blend composed of (i) at least 50 wt % the CBC (based on total weight of the tie layer) and (ii) an ethylene/$C_4$-$C_8$ α-olefin copolymer (that is not a block copolymer). The CBC has a CBCI from 0.4, or 0.5 to 0.6, or 0.7, or 0.8. The fabric laminate has a peel force (Peak Load) from 20 N/15 mm, or 25 N/15 mm, or 30 N/15 mm to 35 N/15 mm, or 40 N/15 mm.

In an embodiment, the fabric laminate includes the fabric sheet composed of propylene homopolymer fabric. The coating layer is a blend composed of (i) an ethylene/$C_4$-$C_8$ α-olefin multi-block copolymer and an ethylene/$C_4$-$C_8$ α-olefin copolymer (that is not a block copolymer). The tie layer is a blend composed solely of the CBC. The CBC has a CBCI from 0.4, or 0.5 to 0.6, or 0.7, or 0.8. The fabric laminate has a peel force (Peak Load) from 20 N/15 mm, or 25 N/15 mm, or 30 N/15 mm to 35 N/15 mm, or 40 N/15 mm.

In an embodiment, the fabric laminate includes the fabric sheet composed of propylene homopolymer fabric. The coating layer is a blend composed solely of an ethylene/$C_4$-$C_8$ α-olefin multi-block copolymer. The tie layer is a blend composed of (i) at least 50 wt % the CBC (based on total weight of the tie layer) and (ii) an ethylene/$C_4$-$C_8$ α-olefin copolymer (that is not a block copolymer). The CBC has a CBCI from 0.4, or 0.5 to 0.6, or 0.7, or 0.8. The fabric laminate has a peel force (Peak Load) from 20 N/15 mm, or 25 N/15 mm, or 30 N/15 mm to 35 N/15 mm, or 40 N/15 mm.

In an embodiment, the fabric laminate includes the fabric sheet composed of propylene homopolymer fabric. The coating layer is a blend composed solely of an ethylene/$C_4$-$C_8$α-olefin multi-block copolymer. The tie layer is composed solely of the CBC. The CBC has a CBCI from 0.4, or 0.5 to 0.6, or 0.7, or 0.8. The fabric laminate has a peel force (Peak Load) from 20 N/15 mm, or 25 N/15 mm, or 30 N/15 mm to 35 N/15 mm, or 40 N/15 mm.

In an embodiment, the fabric laminate includes the fabric sheet composed of propylene homopolymer fabric. The coating layer is composed solely of an ethylene/$C_4$-$C_8$ α-olefin copolymer (that is not a block copolymer). The tie layer is a blend composed of (i) at least 50 wt % the CBC (based on total weight of the tie layer) and (ii) an ethylene/$C_4$-$C_8$ α-olefin copolymer (that is not a block copolymer). The CBC has a CBCI from 0.4, or 0.5 to 0.6, or 0.7, or 0.8. The fabric laminate has a peel force (Peak Load) from 20 N/15 mm, or 25 N/15 mm, or 30 N/15 mm to 35 N/15 mm, or 40 N/15 mm.

In an embodiment, the fabric laminate includes the fabric sheet composed of propylene homopolymer fabric. The coating layer is composed solely of an ethylene/$C_4$-$C_8$ α-olefin copolymer (that is not a block copolymer). The tie layer is composed solely of the CBC. The CBC has a CBCI from 0.4, or 0.5 to 0.6, or 0.7, or 0.8. The fabric laminate has a peel force (Peak Load) from 20 N/15 mm, or 25 N/15 mm, or 30 N/15 mm to 35 N/15 mm, or 40 N/15 mm.

Nonlimiting examples of suitable applications for the present fabric laminate include tarpaulins, bulk grain covers, builders tarp, roof sheet, curtains, channel liner, pond and dam liners, scrims, tank liners, water barrier, geomembranes, ground cover sheets, banners (printed and unprinted) and any combination thereof.

Some embodiments of the present disclosure will now be described in detail in the following Examples.

EXAMPLES

Materials used to produce the articles are provided in Table 1 below.

TABLE 1

| Resin | MFR | density | | Source |
|---|---|---|---|---|
| CBC1 | 9.5 | 0.905 | 50/50, 92% C2 in EP | The Dow Chemical Company |
| CBC2 | 6.6 | 0.895 | 40/60, 92% C2 in EP, 9% C2 in iPP | The Dow Chemical Company |
| | MI | | | |
| INFUSE 9010 | 0.5 | 0.877 | Olefin block copolymer | The Dow Chemical Company |
| ENGAGE 7467 | 1.2 | 0.862 | Ethylene/butene random copolymer | The Dow Chemical Company |
| ENGAGE 8480 | 1 | 0.902 | Ethylene/octene random copolymer | The Dow Chemical Company |
| ENGAGE 8100 | 1 | 0.870 | Ethylene/octene random copolymer | The Dow Chemical Company |
| PP fabric sheet | MI | density | UV-stabilized propylene homopolymer, closed mesh, 8.0 × 8.5 yarns/cm, yarn-size 1000 Denier | Gale Pacific |

CBC1 and CBC2 are produced in a similar manner. CBC2 was prepared under the reaction conditions of Table 2 below. The catalyst was ([[rel-2',2"-[(1R,2R)-1,2-cylcohexanediyl-bis(methyleneoxy-κO)] bis[3-(9H-carbazol-9-yl)-5-methyl [1,1'-biphenyl]-2-olato-κO]](2-)]dimethyl-hafnium). Cocatalyst-1 was a mixture of methyldi(C14-18 alkyl)ammonium salts of tetrakis(pentafluorophenyl)borate, prepared by reaction of a long chain trialkylamine (Armeen™ M2HT, available from Akzo Nobel, Inc.), HCl and Li[B(C6F5)4], substantially as disclosed in U.S. Pat. No. 5,919,983, Ex. 2., which were purchased from Boulder Scientific and used without further purification. Cocatalyst-2 was modified methylalumoxane (MMAO), which was purchased from Akzo Nobel and used without further purification. "DEZ" refers to chain shuttling agent diethylzinc.

TABLE 2

| | CBC2 | |
|---|---|---|
| Material | 1st Reactor | 2nd Reactor |
| Reactor Control Temp.(° C.) | 152 | 130 |
| Solvent Feed (lb/hr) | 273 | 141 |
| Propylene Feed (lb/hr) | 2.67 | 48.4 |
| Ethylene Feed (lb/hr) | 33.2 | 4.1 |
| Hydrogen Feed SCCM) | 0 | 0 |
| Reactor Propylene Conc. (g/L) | 0.25 | 2.74 |
| Catalyst Efficiency (gPoly/gM) *1.0E6 | 0.27 | 0.32 |
| Catalyst Flow (lb/hr) | 0.66 | 0.79 |
| Catalyst Conc. (ppm) | 200 | 200 |
| Cocatalyst-1 Flow (lb/hr) | 0.94 | 1.12 |
| Cocatalyst-1 Conc. (ppm) | 1400 | 1400 |
| Cocat.-2 Flow (lb/hr) | 0.91 | 0.18 |
| Cocat.-2 Conc. (ppm) | 1993 | 1993 |
| DEZ Flow (lb/hr) | 1.45 | 0 |
| DEZ Conc. (ppm) | 30000 | 0 |

The properties of CBC1 and CBC2 are provided in Tables 3-4 below.

TABLE 3

| | MFR (230° C./ 2.16 kg) (8/10 min) | wt % PP from HTLC Separation | Mw (kg/mol) | Mw/Mn | Total wt % $C_2$ (NMR) | Tm (° C.) Peak 1/ Peak 2 | Tc (° C.) | Melt Enthalpy (J/g) |
|---|---|---|---|---|---|---|---|---|
| CBC 1 | 9.5 | 19.9 | 104 | 2.73 | 47.6 | 108 (130) | 88 | 95 |
| CBC 2 | 6.6 | 21.0* | 119 | 3.08 | 42.9 | 107 | 87 | 87 |

*Determined by TGIC

TABLE 4

| | wt % EP | wt % iPP | wt % $C_2$ in EP | wt % $C_2$ in iPP | CBCI | BCI | mol % $C_2$ in EP | mol % $C_2$ in iPP |
|---|---|---|---|---|---|---|---|---|
| CBC 1 | 50 | 50 | 92 | 0.5 | 0.549 | N/A | 94.5 | 0.7 |
| CBC 2 | 40 | 60 | 92 | 9.0 | 0.639 | N/A | 94.5 | 12.9 |

1. Crystalline Block Composite Index (CBCI) Calculations

CBCI provides an estimate of the quantity of block copolymer within the CBC under the assumption that the ratio of CEB to CAOB within the diblock is the same as the ratio of ethylene to α-olefin in the overall CBC. This assumption is valid for these statistical CBC copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in these examples, the CAOP) and polyethylene (in these examples, the CEP). Consequently, the polyethylene fraction contains an appreciable amount of propylene that would not otherwise be present if the polymer was simply a blend of polypropylene and polyethylene. To account for this "extra propylene," a mass balance calculation can be performed to estimate the CBCI from the amount of the polypropylene and polyethylene fractions and the wt % propylene present in each of the fractions that are separated by HTLC. The corresponding CBCI calculations for CBC1 and CBC2 are provided in Table 5.

TABLE 5

| Line | Variable | Source | CBC 1 | CBC2 |
|---|---|---|---|---|
| 1 | Overall wt % C3 Total | Measured | 52.400 | 57.100 |
| 2 | wt % C3 in PP block/polymer | Measured | 99.000 | 91.000 |
| 3 | wt % C3 in PE block/polymer | Measured | 10.500 | 10.000 |
| 4 | wt fraction PP (in block or polymer) | Eq. 2 below | 0.500 | 0.581 |
| 5 | wt fraction PE (in block or polymer) | 1-Line 4 | 0.500 | 0.419 |
| | Analysis of HTLC Separation | | | |
| 6 | wt fraction isolated PP | Measured | 0.199 | 0.210 |
| 7 | wt fraction PE fraction | Measured | 0.801 | 0.790 |
| 8 | wt % C3 in PE-fraction | Eq. 4 below | 40.823 | 48.100 |
| 9 | wt fraction PP-diblock in PE fraction | Eq. 6 below | 0.343 | 0.470 |
| 10 | wt fraction PE in PE fraction | 1-Line 10 | 0.657 | 0.530 |
| 11 | wt fraction diblock in PE fraction | 10/Line 4 | 0.685 | 0.809 |
| 12 | CBCI | Eq. 7 below | 0.549 | 0.639 |

Referring to Tables 3-5, above, the CBCI is measured by first determining a summation of the weight percent propylene from each component in the polymer according to Equation 1, below, which results in the overall wt % propylene/$C_3$ (of the whole polymer). This mass balance equation can be used to quantify the amount of the PP and PE present in the block copolymer. This mass balance equation can also be used to quantify the amount of PP and PE in a binary blend or extended to a ternary, or n-component blend. For CBC1 and CBC2, the overall amount of PP or PE is contained within the blocks present in the block copolymer and the unbound PP and PE polymers.

$$\text{wt \% C}_{3\ overall} = w_{PP}(\text{wt \% C}_{3\ PP}) + w_{PE}(\text{wt \% C}_{3\ PE}) \quad \text{Equation 1}$$

where $w_{PP}$ is the weight fraction of PP in the polymer; $w_{PE}$ is the weight fraction of PE in the polymer; wt % $C_{3\ PP}$ is the weight percent of propylene in the PP component or block; and wt % $C_{3\ PE}$ is the weight percent of propylene in the PE component or block.

Note that the overall weight percent of propylene ($C_3$) is measured from $C^{13}$ NMR or some other composition measurement that represents the total amount of $C_3$ present in the whole polymer. The weight percent propylene in the PP block (wt % $C_{3\ PP}$) is set to 100 (if applicable) or if otherwise known from its DSC melting point, NMR measurement, or other composition estimate, that value can be put into its place. Similarly, the weight percent propylene in the PE block (wt % $C_{3\ PE}$) is set to 100 (if applicable) or if otherwise known from its DSC melting point, NMR measurement, or other composition estimate, that value can be put into its place. The weight percent of $C_3$ is shown in Table 5.

Based on Equation 1, the overall weight fraction of PP present in the polymer can be calculated using Equation 2 from the mass balance of the total $C_3$ measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the CBC, it is assumed that the ratio of the weight fraction of PP to PE also corresponds to the average block ratio between PP and PE present in this statistical block copolymer.

$$w_{PP} = \frac{\text{wt\%C}_{3\ overall} - \text{wt\%C}_{3\ PE}}{\text{wt\%C}_{3\ PP} - \text{wt\%C}_{3\ PE}} \quad \text{Equation 2}$$

where $w_{PP}$ is the weight fraction of PP in the polymer; wt % $C_{3\ PP}$ is the weight percent of propylene in the PP component or block; and wt % $C_{3\ PE}$ is the weight percent of propylene in the PE component or block.

To estimate the amount of the block copolymer (diblock) in the CBC, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the diblock copolymer. By substituting the overall weight percent $C_3$ of the whole polymer in the left hand side of Equation 3, and the weight fraction of PP (isolated from HTLC) and the weight fraction of PE (separated by HTLC) into the right hand side of Equation 3, the weight percent of $C_3$ in the PE fraction can be calculated using Equations 4 and 5. The PE fraction is described as the fraction separated from the unbound PP and contains the diblock and unbound PE. The composition of the isolated PP is assumed to be the same as the weight percent propylene in the PP block as described previously.

$$\text{wt\% C}_{3\ overall} = \quad \text{Equation 3}$$
$$w_{PP\ isolated}(\text{wt\%C}_{3\ PP}) + w_{PE-fraction}(\text{wt\%C}_{3\ PE-fraction})$$

$$\text{wt\%C}_{3\ PE-fraction} = \frac{\text{wt\%C}_{3\ overall} - w_{PP\ isolated}(\text{wt\%C}_{3\ PP})}{w_{PE-fraction}} \quad \text{Equation 4}$$

$$w_{PE-fraction} = 1 - w_{PP\ isolated} \quad \text{Equation 5}$$

where $w_{PP\ isolated}$ is the weight fraction of isolated PP from HTLC; $w_{PE-fraction}$ is the weight fraction of PE separated from HTLC, containing the diblock and unbound PE; wt % $C_{3\ PP}$ is the wt % of propylene in the PP; which is also the same amount of propylene present in the PP block and in the unbound PP; wt % $C_{3\ PE-fraction}$ is the wt % of propylene in the PE-fraction that was separated by HTLC; and wt % $C_{3\ overall}$ is the overall wt % propylene in the whole polymer.

The amount of wt % $C_3$ in the polyethylene fraction from HTLC represents the amount of propylene present in the block copolymer fraction that is above the amount present in the 'unbound polyethylene.' To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{\text{wt\%C}_{3\ PE-fraction} - \text{wt\%C}_{3\ PE}}{\text{wt\%C}_{3\ PP} - \text{wt\%C}_{3\ PE}} \quad \text{Equation 6}$$

where wt % $C_{3\ PE-fraction}$ is the wt % of propylene in the PE-fraction that was separated by HTLC (Equation 4); wt %

$C_{3\ PP}$ is the wt % of propylene in the PP component or block (defined previously); wt % $C_{3\ PE}$ is the wt % of propylene in the PE component or block (defined previously); and $w_{PP\text{-}diblock}$ is the weight fraction of PP in the diblock separated with PE-fraction by HTLC.

The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in Equation 2) and then multiplied by the weight fraction of the PE fraction.

3. Production of Fabric Laminate

Cast Film production for the tie layer:

Monolayer cast films of 2 mil (50 μm) thickness (tie layer) are produced on a Dr. Collin co-extrusion cast film line equipped with three single screw extruders. The processing temperature is set at around 220° C. The throughput is about 6 kg/hr. The film take up speed is 10 m/min. For the film fabricated from CBC1/ENGAGE 8100 (80/20) blend, the materials are dry blended prior to film extrusion.

Calendaring trials are performed on a ZE 25 twin-screw direct extrusion line. The material feed concept is shown in FIG. 1.

Figure 1:
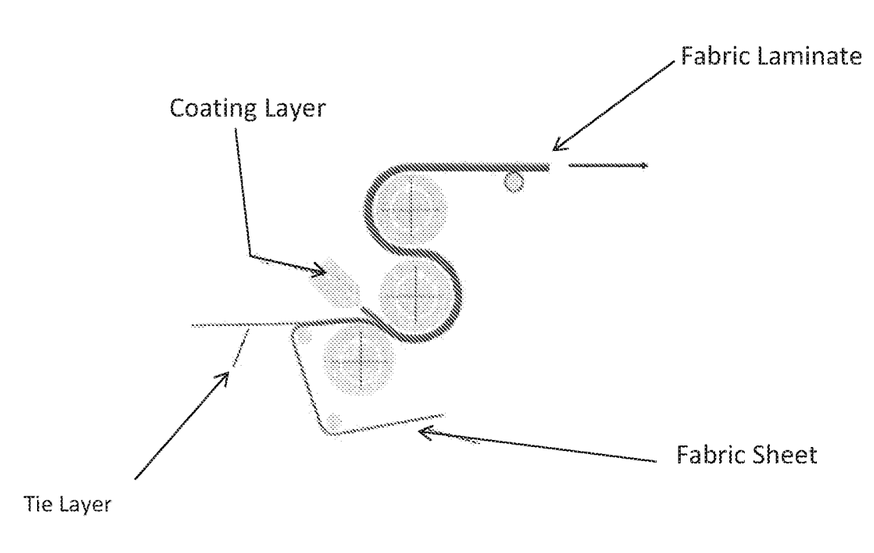
FIG. 1 is a schematic representation of the fabrication of a fabric laminate in accordance with an embodiment of the present disclosure.

As shown in FIG. 1, the monolayer film of the tie layer was fed together with the fabric sheet (from Table 1) into the first calendar gap of a three roll, 450 mm lab-calendar. On the free-surface of the tie layer, the top coating material is simultaneously fed into the first calendar gap from a 300 mm wide film die as a direct extruded melt The film die is set to an opening of the die of 1 mm, by drawing down and calendaring in the gap, a final sheet thickness of the overall structure of 0.75 mm was received. Table 6 (below) lists the extruder and calendar settings for the direct extrusion experiments.

The material feed concept is shown in FIG. 1.

Table 6 provides the direct extrusion processing conditions.

The trial program with results is listed in Table 7-9 below. Table 7 shows the peel force between coated film and PP fabric using a 50/50 blend of INFUSE 9010/ENGAGE 8480 as coating layer. Comparative Example 1 without a tie layer has relatively low peel force. Inventive Example 1 exhibits significantly increased peel strength, using CBC1/ENGAGE 8100 (80/20) as a tie layer. The tie layer has good adhesion to both the coating layer and the PP fabric, which improves the adhesion between the film and PP fabric. Inventive Example 2, using CBC2 as a tie layer, exhibits even higher peel strength. This is attributable to lower melting temperature of CBC2 as compared to CBC1.

TABLE 7

| | INTUNE for PP fabrics coating in calendaring | | |
|---|---|---|---|
| Ex | Comparative 1 | Inventive 1 | Inventive 2 |
| Coating layer | INFUSE 9010/ENGAGE 8480 (50/50) | | |
| Tie layer film | No tie layer | CBC1/ ENGAGE 8100 (80/20) | CBC2 |
| PP fabric | GALE PACIFIC PP fabric | | |
| Peel force btw film and fabric* | | | |
| Peak Load, N/15 mm | 16.2 | 21.3 | 27.2 |
| Standard deviation, N/15 mm | 1.5 | 0.6 | 1.4 |

*According to ISO 11339 (using 15 mm width strip)

*According to ISO 11339 (using 15 mm width strip)

Table 8 (below) shows the peel force between coated film and PP fabric using a 100% INFUSE 9010 as coating layer. Consistent with Table 6, using CBC1/ENGAGE 8100 blend as a tie layer (Inventive 3), using CBC2 as a tie layer (Inventive 4), and using CBC1 as a tie layer (Inventive 3), all exhibit higher peel force as compared to Comparative Sample 2 without a tie layer. The Inventive Examples 3-5 also show higher seal strength vs Comparative Sample 2. The tie layers in Inventive Examples 3-5 have good adhesion to both the coating layer and the PP fabric, which improves the adhesion between the film and PP fabric. As a result, it also improves heat seal strength.

TABLE 6

| Extruder | | | | | | | | | | | | | Calendar | | | |
|---|---|---|---|---|---|---|---|---|---|---|---|---|---|---|---|---|
| Temperature settings [° C.] | | | | | | | | | | Extruder Conditions | | | | Roll 1 | Roll 2 | Roll 3 | Composite |
| | | | | | | | | | | MELT Temperature [° C.] | Melt pressure [bar] | Screw speed [rpm] | Total output [kg/h] | Machine Torque [%] | Die gap [mm] | Take off [m/min] | Temperature [° C.] | Temperature [° C.] | Temperature [° C.] | thickness [μm] |
| 21 | 22 | 23 | 24 | 25 | 26 | 27 | 28 | Flange | Adapter | Die | | | | | | | | | | |
| 40 | 180 | 210 | 210 | 210 | 210 | 210 | 210 | 210 | 210 | 210 | 228 | 120 | 250 | 14 | 84 | 1 | 2 | 50 | 50 | 20 | 750 |

TABLE 8

| Ex | Inventive 3 | Inventive 4 | Inventive 5 | Comparative 2 |
|---|---|---|---|---|
| Coating layer | | INFUSE 9010 | | |
| Tie layer film | CBC1/ENGAGE 8100 (80/20) | CBC2 | CBC1 | No tie layer |
| PP fabric | | GALE PACIFIC PP fabric | | |
| Peel force btw film and fabric* | | | | |
| Peak Load, N/15 mm | 25.9 | 27.4 | 29.0 | 21.0 |
| Standard deviation, N/15mm | 0.8 | 1.1 | 1.5 | 0.5 |
| Heat seal strength (Heat seal condition: 150 C., 4 sec) | | | | |
| Heat seal Peak Load (N/15 mm) | 207.2 | 195.9 | 224.6 | 110.6 |
| Std Dev Peak Load (N/15 mm) | 4.6 | 8.0 | 6.9 | 9.8 |

*According to ASTM F904 (using 25.4 mm width strip)

Table 9 (below) shows the peel force between coated film and PP fabric using a 100% ENGAGE 8480 as coating layer. Comparing the Comparative Sample 3 in Table 9 with the Comparative Sample 2 in Table 8 indicates that the peel force between ENGAGE 8480 and PP fabric (11.1 N/15 mm) is intrinsically lower than the peel force between INFUSE 9010 and PP fabric (21.0 N/15 mm). However, using CBC1/ENGAGE 8100 blend as a tie layer (Inventive 6), using CBC2 as a tie layer (Inventive 7), and using CBC1 as a tie layer (Inventive 8), all give higher peel force as compared to Comparative Sample 3. Among them, CBC2 as a tie layer provides the highest peel force, which again is attributable to the lower melting temperature of CBC2. The tie layers in Inventive Examples 6-8 also improve heat seal strength.

TABLE 9

| Ex | Inventive 6 | Inventive 7 | Inventive 8 | Comparative 3 |
|---|---|---|---|---|
| Coating layer | | ENGAGE 8480 | | |
| Tie layer film | CBC1/ENGAGE 8100 (80/20) | CBC2 | CBC1 | No tie layer |
| PP fabric | | GALE PACIFIC PP fabric | | |
| Peel force btw film and fabric* | | | | |
| Peak Load, N/15mm | 21.8 | 31.3 | 21.8 | 11.1 |
| Standard deviation, N/15 mm | 1.0 | 5.7 | 4.8 | 2.2 |
| Heat seal strength (Heat seal condition: 150 C., 4 sec) | | | | |
| Heat seal Peak Load (N/15 mm) | 131.8 | 144.1 | 129.3 | 104.8 |
| Std Dev Peak Load (N/15 mm) | 8.4 | 18.9 | 8.9 | 5.5 |

*According to ASTM F904 (using 25.4 mm width strip)

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A fabric laminate comprising:
   a fabric sheet composed of propylene-based polymer fibers;
   a coating layer composed of one or more ethylene-based polymers;
   a tie layer located between the fabric sheet and the coating layer, the tie layer composed of
   at least 50 wt % of a crystalline block composite (CBC) and an optional blend component, the CBC comprising
   (i) an isotactic crystalline propylene homopolymer (iPP);
   (ii) an ethylene/propylene copolymer; and
   (iii) a diblock with the formula (EP)-(iPP);
   the CBC having a block composite index (CBCI) from 0.1 to 1.0,
   wherein the fabric laminate has a peel force from 20 N/15 mm to 40 N/15 mm.

2. The multilayer sheet of claim 1 wherein the tie layer is in direct contact with the fabric sheet and the tie layer is in direct contact with the coating layer.

3. The fabric laminate of claim 2 wherein
   the coating layer is composed of a blend of an ethylene/α-olefin multi-block copolymer and an ethylene/α-olefin copolymer;
   the tie layer consists of the CBC; and
   the fabric laminate has a peel force from 20 N/15 mm to 40 N/15 mm.

4. The fabric laminate of claim 2 wherein the coating layer is composed of a blend of an ethylene/α-olefin multi-block copolymer and an ethylene/α-olefin copolymer;
   tie layer comprises from 70 wt % to 90 wt % of the CBC and from 30 wt % to 10 wt % of a blend component that is an ethylene/α-olefin copolymer; and
   the fabric laminate has a peel force from greater than 20 N/15 mm to 40 N/15 mm.

5. The fabric laminate of claim 2 wherein
   the coating layer consists of an ethylene/α-olefin block copolymer;
   the tie layer consists of the CBC; and
   the fabric laminate has a peel force from 20 N/15 mm to 40 N/15 mm.

6. The fabric laminate of claim 2 wherein
   the coating layer consists of an ethylene/α-olefin multi-block copolymer;
   tie layer comprises from 70 wt % to 90 wt % of the a CBC and from 30 wt % to 10 wt % of a blend component that is an ethylene/α-olefin copolymer; and the fabric laminate has a peel force from greater than 20 N/15 mm to 40 N/15 mm.

* * * * *